(12) United States Patent
Shade et al.

(10) Patent No.: US 7,168,037 B2
(45) Date of Patent: Jan. 23, 2007

(54) TEXT COMPOSITION SPACING AMOUNT SETTING DEVICE WITH ICON INDICATORS

(75) Inventors: Marilyn E. Shade, Menlo Park, CA (US); Shinji Hiramatsu, Kawasaki (JP)

(73) Assignee: Adobe Systems Incorporated, San Jose, CA (US)

( * ) Notice: Subject to any disclaimer, the term of this patent is extended or adjusted under 35 U.S.C. 154(b) by 1040 days.

(21) Appl. No.: 09/964,293

(22) Filed: Sep. 25, 2001

(65) Prior Publication Data

US 2005/0177786 A1    Aug. 11, 2005

Related U.S. Application Data

(60) Provisional application No. 60/235,260, filed on Sep. 25, 2000.

(51) Int. Cl.
*G06N 3/00* (2006.01)

(52) U.S. Cl. ........................ 715/518; 715/519

(58) Field of Classification Search ............... 715/518, 715/519, 531; 400/304; 707/103 R; 345/765, 345/468
See application file for complete search history.

(56) References Cited

U.S. PATENT DOCUMENTS

| | | | |
|---|---|---|---|
| 4,284,975 A | 8/1981 | Odaka | 345/648 |
| 4,291,381 A | 9/1981 | Siebeck | 382/185 |
| 4,591,999 A * | 5/1986 | Logan | 715/519 |
| 4,608,664 A | 8/1986 | Bartlett et al. | 715/519 |
| 4,833,627 A | 5/1989 | Leszczynski | 715/519 |
| 5,018,083 A | 5/1991 | Wantanabe et al. | 715/519 |
| 5,175,806 A | 12/1992 | Muskovitz et al. | 715/517 |
| 5,287,443 A | 2/1994 | Mameda et al. | 345/582 |

(Continued)

FOREIGN PATENT DOCUMENTS

JP         61-282974        12/1986

(Continued)

OTHER PUBLICATIONS

Screenshots of Microsoft Word (character spacing feature), 1983-1999, Microsoft Corporation, pp. 1-6.*

(Continued)

*Primary Examiner*—Stephen Hong
*Assistant Examiner*—Manglesh Patel
(74) *Attorney, Agent, or Firm*—Fish & Richardson P.C.

(57) ABSTRACT

Methods and apparatus for setting a text composition spacing amount for a DTP system. At least one inter-character-class spacing amount setting table, for use in line composition, groups similar characters, forms a plurality of character classes and sets inter-character spacing amounts between a character class of a previous character and a character class of a next character within a pair of continuous characters. A display device displays electronic text that has been line composed. An input device receives user input. A spacing amount setter is operable to start in response to user input, to display a dialog box for user input of a spacing amount between the character class for the previous character and the character class for the next character, and to display in the dialog box an icon representing the character class for the previous character and an icon representing the character class for the next character.

10 Claims, 14 Drawing Sheets

U.S. PATENT DOCUMENTS

| | | | |
|---|---|---|---|
| 5,399,029 A * | 3/1995 | Muraoka et al. | 400/9 |
| 5,416,898 A * | 5/1995 | Opstad et al. | 345/468 |
| 5,432,890 A | 7/1995 | Watanabe | 400/9 |
| 5,500,931 A | 3/1996 | Sonnenschein | 715/519 |
| 5,501,538 A * | 3/1996 | Sawada et al. | 400/304 |
| 5,548,700 A | 8/1996 | Bagley et al. | 400/304 |
| 5,579,471 A | 11/1996 | Barber et al. | 715/540 |
| 5,581,670 A | 12/1996 | Bier et al. | 715/700 |
| 5,590,260 A * | 12/1996 | Morse et al. | 345/467 |
| 5,617,115 A | 4/1997 | Itoh et al. | 715/856 |
| 5,724,072 A | 3/1998 | Freeman et al. | 345/468 |
| 5,724,596 A | 3/1998 | Lathrop | 715/519 |
| 5,740,456 A | 4/1998 | Harel et al. | 715/518 |
| 5,778,403 A | 7/1998 | Bangs | 715/527 |
| 5,802,532 A * | 9/1998 | Nakayama et al. | 400/304 |
| 5,803,629 A * | 9/1998 | Neville et al. | 400/9 |
| 5,805,167 A | 9/1998 | Van Cruyningen | 715/808 |
| 5,809,166 A | 9/1998 | Huang et al. | 382/178 |
| 5,937,420 A | 8/1999 | Karow et al. | 715/518 |
| 6,038,567 A * | 3/2000 | Young | 707/103 R |
| 6,088,520 A | 7/2000 | Taoka et al. | 716/21 |
| 6,252,607 B1 * | 6/2001 | Babcock | 345/468 |
| 6,321,243 B1 | 11/2001 | Ballard | 715/517 |
| 6,330,577 B1 | 12/2001 | Kim | 715/542 |
| 6,359,630 B1 | 3/2002 | Morse et al. | 345/620 |
| 6,426,751 B1 | 7/2002 | Patel et al. | 345/468 |
| 6,504,544 B1 | 1/2003 | Hollingsworth et al. | 345/467 |
| 6,507,678 B2 * | 1/2003 | Yahagi | 382/305 |
| 6,510,441 B1 | 1/2003 | Kenninga | 715/521 |
| 6,624,814 B1 | 9/2003 | Karow et al. | 345/467 |
| 6,626,960 B1 * | 9/2003 | Gillam | 715/531 |
| 6,686,935 B1 * | 2/2004 | Richard | 715/765 |
| 6,829,748 B1 * | 12/2004 | Browne et al. | 715/531 |
| 6,886,133 B2 * | 4/2005 | Bailey et al. | 715/531 |
| 2001/0048764 A1 | 12/2001 | Betrisey et al. | 382/162 |
| 2002/0062324 A1 | 5/2002 | McCully et al. | 715/517 |

FOREIGN PATENT DOCUMENTS

| | | |
|---|---|---|
| JP | 01-125656 | 5/1989 |
| JP | 1-271275 | 10/1989 |
| JP | 02-213983 | 8/1990 |
| JP | 04-052871 | 2/1992 |
| JP | 04-319764 | 11/1992 |
| JP | 05-224651 | 9/1993 |
| JP | 06-20026 | 1/1994 |
| JP | 06-96174 | 4/1994 |
| JP | 06-149806 | 5/1994 |
| JP | 6-149806 | 5/1994 |
| JP | 06-219011 | 8/1994 |
| JP | 07-096594 | 4/1995 |
| JP | 07-149005 | 6/1995 |
| JP | 07-182303 | 7/1995 |
| JP | 8-137871 | 5/1996 |
| JP | 08-161309 | 6/1996 |
| JP | 08-194832 | 7/1996 |
| JP | 08-314655 | 11/1996 |
| JP | 10-069477 | 3/1998 |
| JP | 10-222499 | 8/1998 |
| JP | 11-102446 | 4/1999 |
| JP | 11-353491 | 12/1999 |
| JP | 2000-267645 | 9/2000 |
| JP | 2001-281835 | 10/2001 |
| JP | 2001-297077 | 10/2001 |
| JP | 2003-523015 | 7/2003 |

OTHER PUBLICATIONS

Hirschberg, D.S. et al., "New Applications of Failure Functions", *Journal of the Association for Computing Machinery*, vol. 34, No. 3, Jul. 1987, pp. 616-625.

Peter Karow, "Extending Control of Digital Typography", Visible Language, 32.2, Visible Language 1998, pp. 100-127 (671001 IDS Sep. 30, 2004).

* cited by examiner

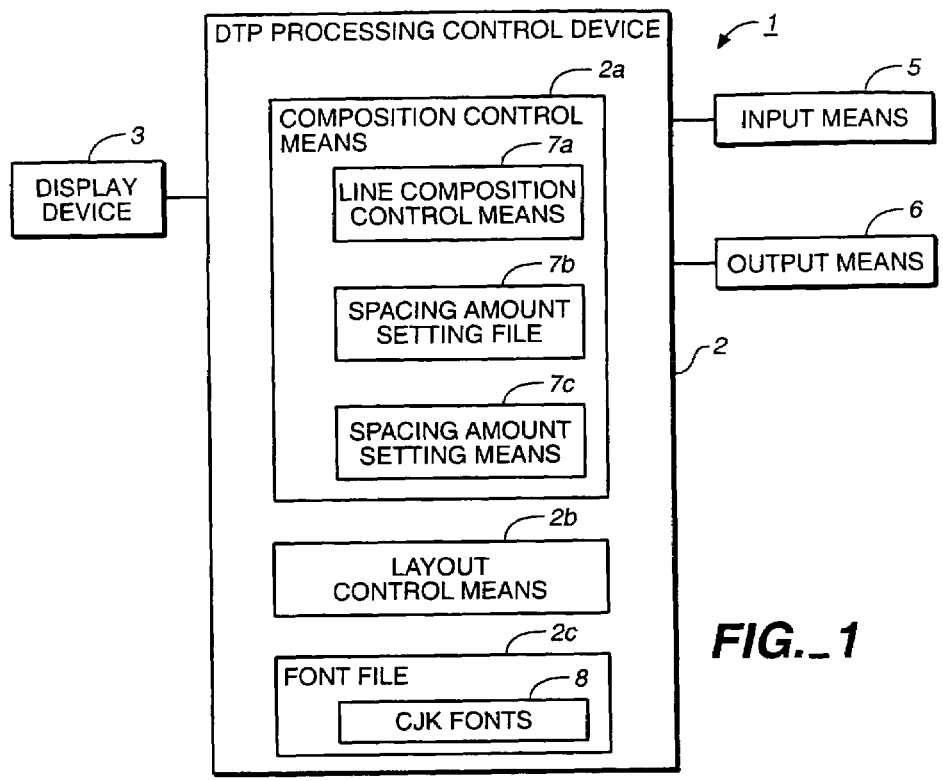
FIG._1
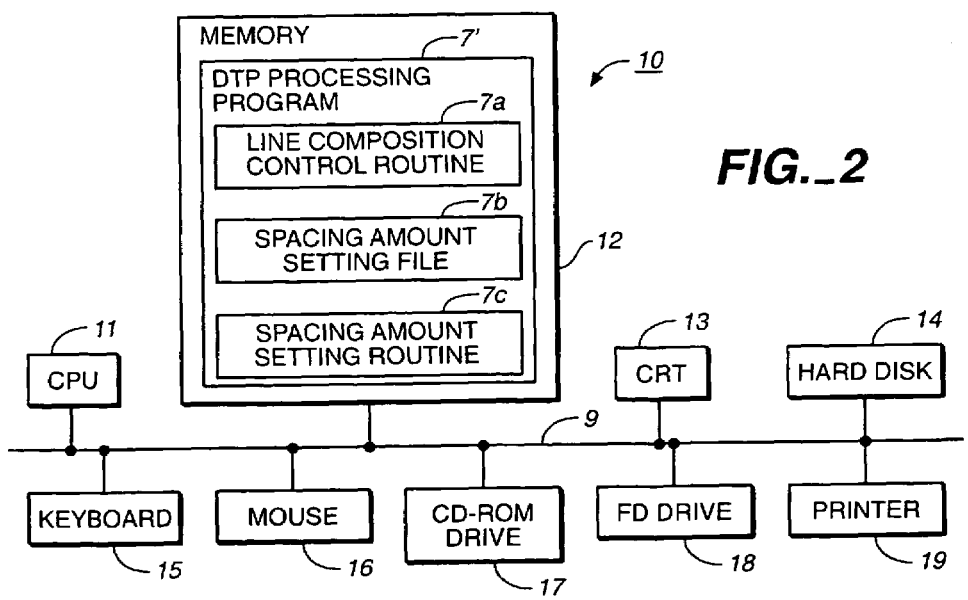
FIG._2

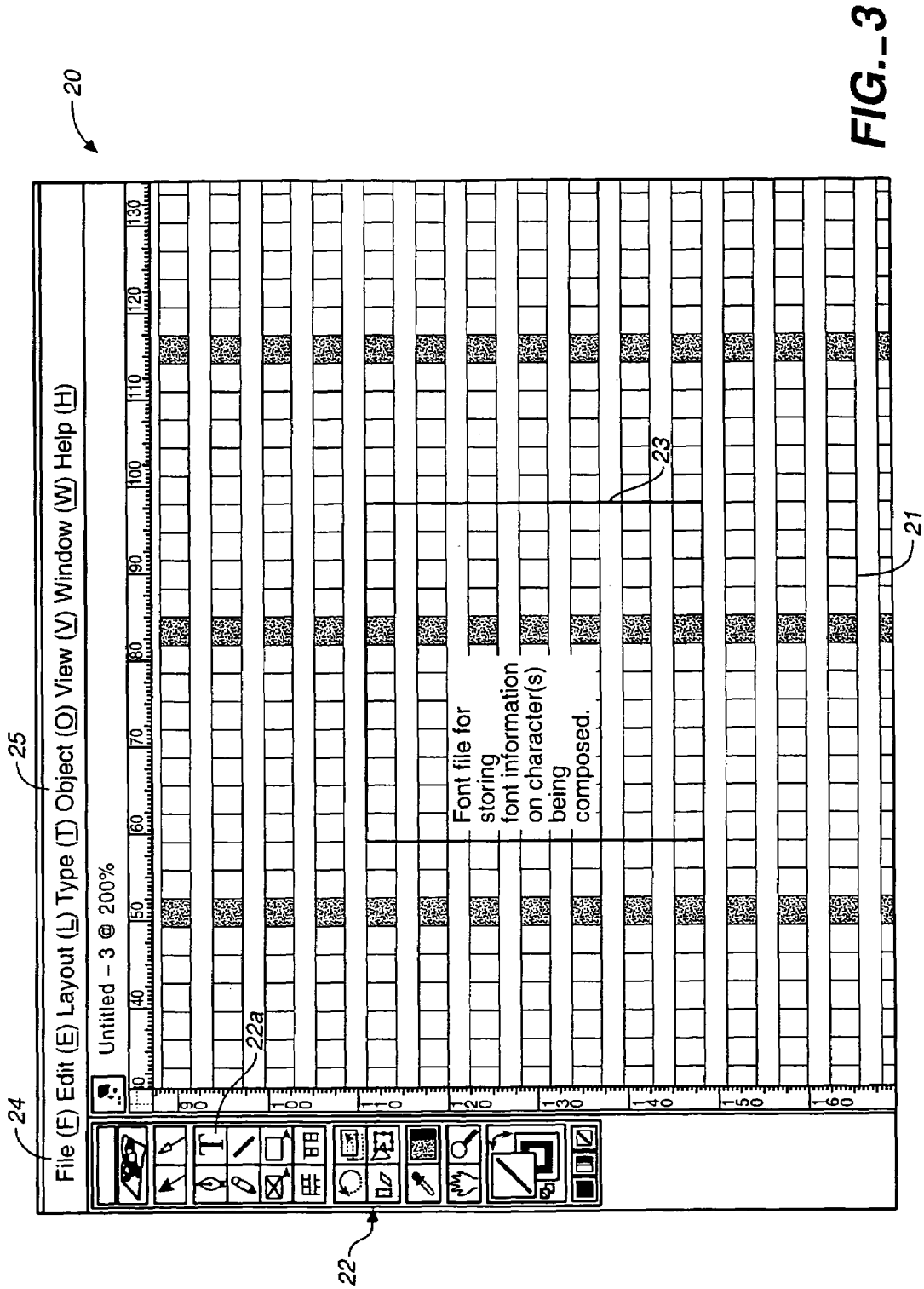
FIG._3

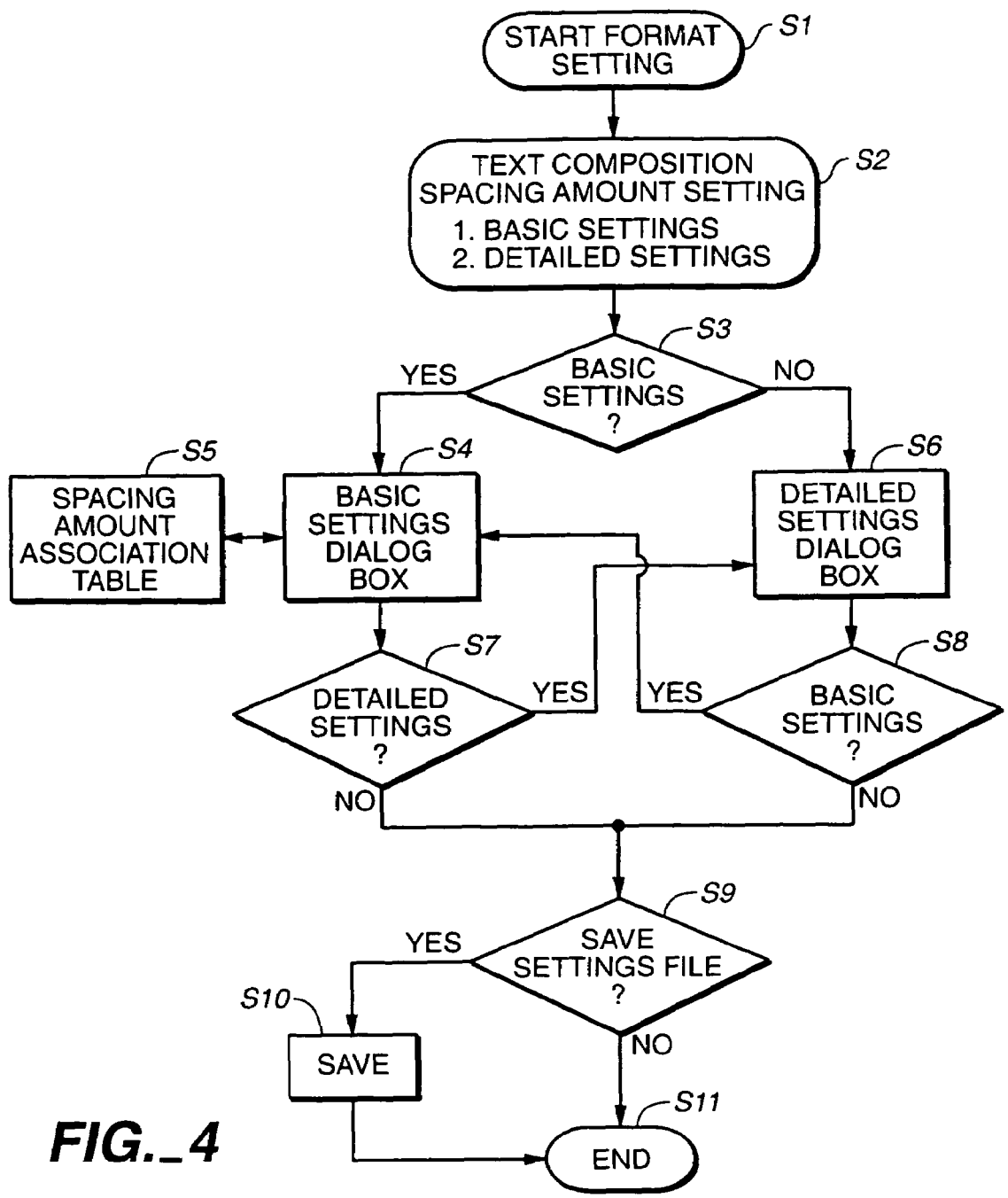
FIG._4

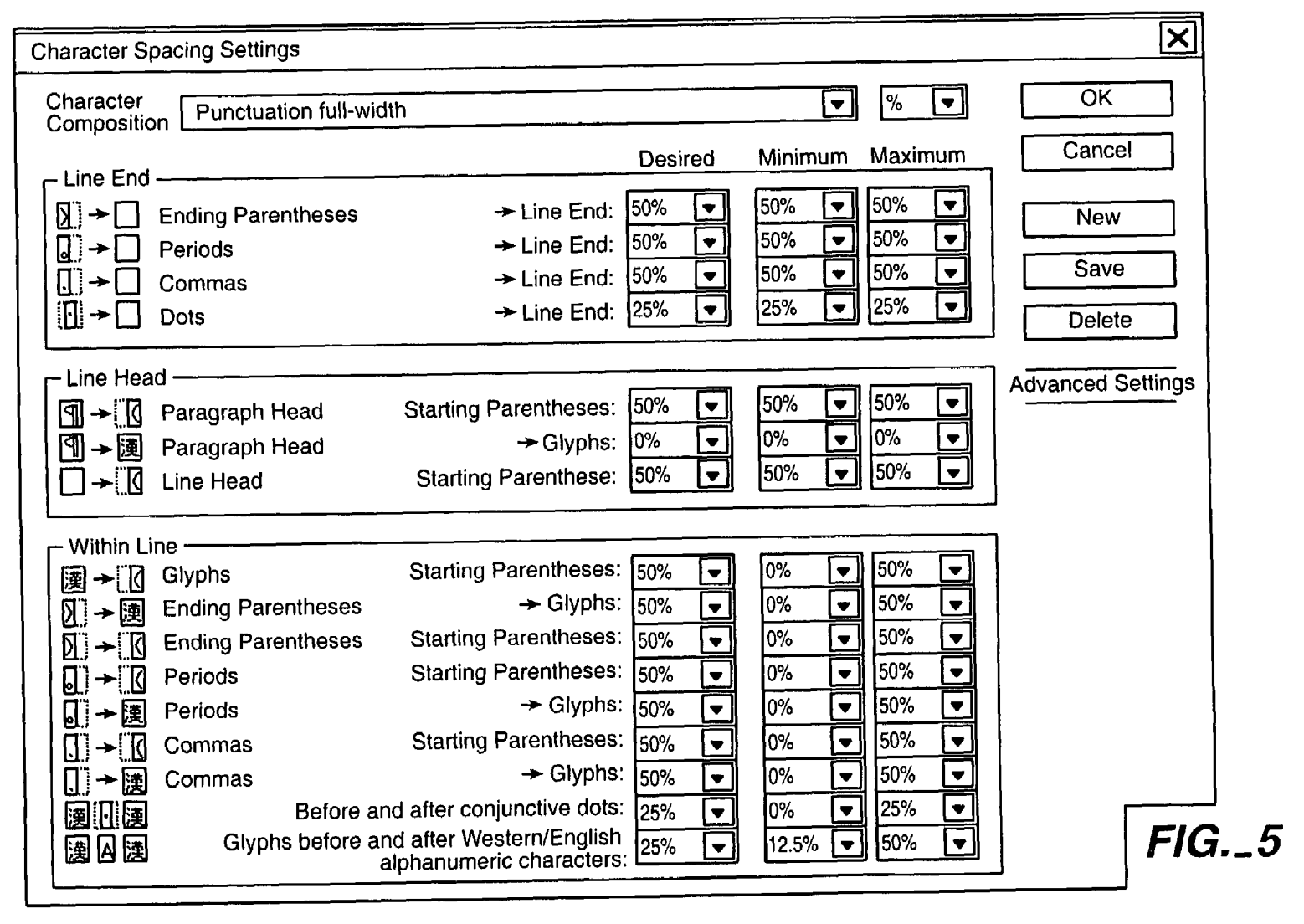

FIG._5

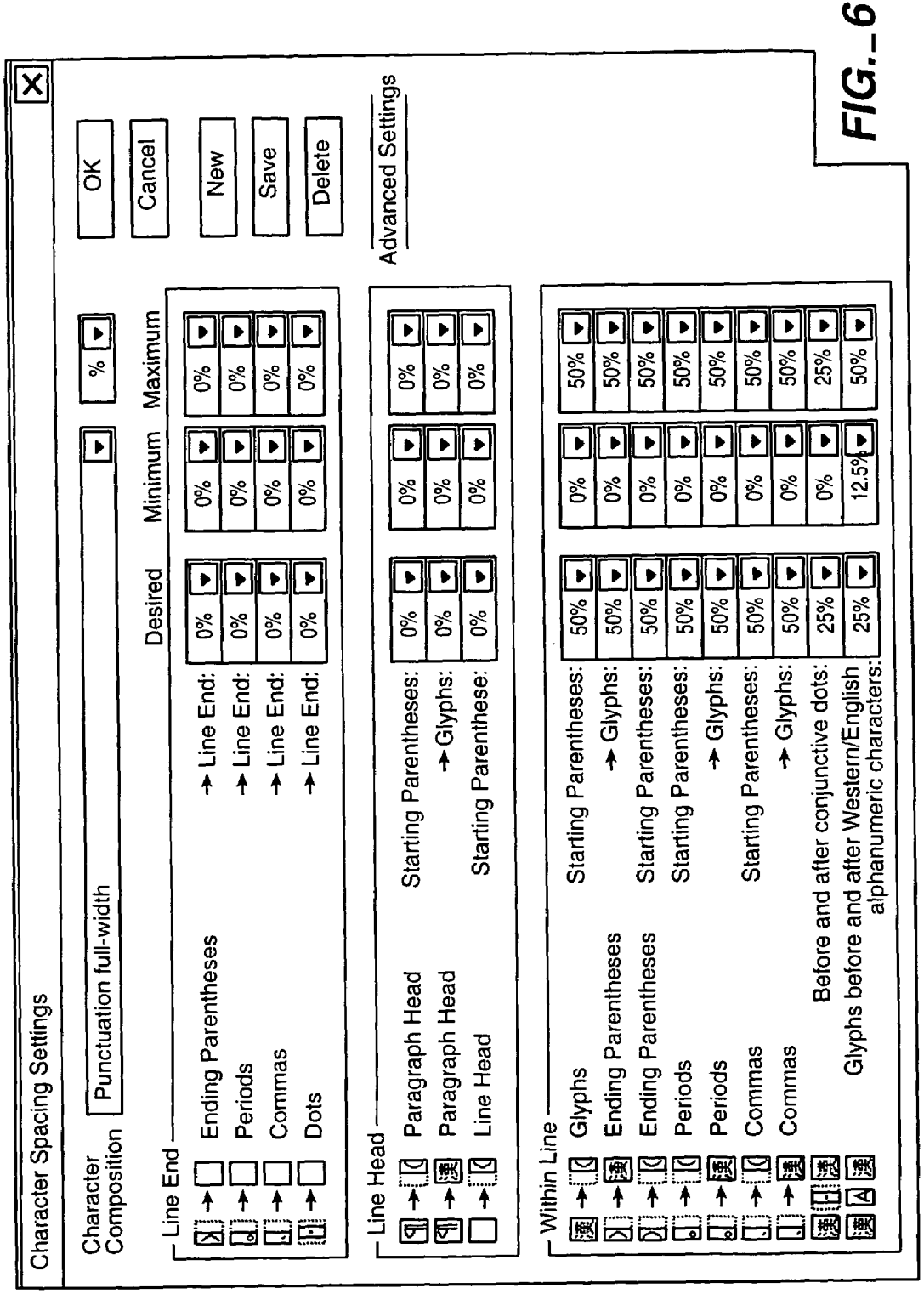
FIG._6

FIG._7

| Types | Ending Character Class | Desired | Minimum | Maximum | Priority |
|---|---|---|---|---|---|
| | Starting Parentheses: | 0% | 0% | 0% | None |
| | Ending Parentheses: | 0% | 0% | 0% | 3 |
| | Line Head Japanese word-wrapping: | 0% | 0% | 0% | None |
| | Ending Punctuation Marks: | 0% | 0% | 0% | None |
| | Conjunctive Dots: | 25% | 0% | 25% | 1 |
| | Commas: | 0% | 0% | 0% | None |
| | Period: | 0% | 0% | 0% | 2 |
| | Ellipses: | 0% | 0% | 100% | None |
| | Previous Abbreviated Symbols: | 0% | 0% | 100% | None |
| | Subsequent Abbreviated Symbols: | 0% | 0% | 100% | None |
| | Ideographic Spaces: | 0% | 0% | 100% | None |
| | Hiragana: | 0% | 0% | 0% | None |
| | Other Ideographs: | 0% | 0% | 0% | None |
| | Full-width Digits: | 0% | 0% | 0% | 4 |
| | Half-width Digits: | 0% | 0% | 0% | 4 |
| | Western Alphabet: | 0% | 0% | 0% | 3 |
| | Line End: | 0% | 0% | 0% | 3 |
| | Paragraph Head: | 0% | 0% | 0% | |

Character Spacing Settings

Character Composition: Line end punctuation half-width    %

Previous character class  :  Starting parenthesis type

OK
Cancel
New
Save
Delete

Advanced Settings

| Next Character \ Previous Character | 1 Starting parenthesis type | 2 Ending parenthesis type | 3 Character that cannot appear at the start of a line | 4 Non-centered punctuation | 5 Centered punctuation | 6 Period |
|---|---|---|---|---|---|---|
| 1 Starting parenthesis type | | | | | | |
| 2 Ending parenthesis type | 3 | | | | 8 | |
| 3 Character that cannot appear at the start of a line | 1 | | 2 | 2 | 8 | |
| 4 Non-centered punctuation | 1 | | | | 8 | |
| 5 Centered punctuation | 8 | 8 | 8 | 8 | 8 8 | 8 |
| 6 Period | 4 | | 5 | 5 | 8 | |
| 7 Comma | 6 | | 7 | 7 | 7 8 | |
| 8 Repeating characters that cannot be broken across lines | 1 | | | | 8 | |
| 9 Preceding abbreviation code | 1 | | | | 8 | |
| 10 Following abbreviation code | 1 | | | | 8 | |
| 11 Full-width ideographic spaces | | | | | | |
| 12 Hiragana | 1 | | | | 8 | |
| 13 Japanese character other than those listed above | 1 | | | | 8 | |
| 14 Full-width numeral | 1 | | | | 8 | |
| 15 Half-width numeral | 1 | | | | 8 | |
| 16 Half-width Roman text | 1 | | | | 8 | |
| 17 Start of line | 12 | | | | | |
| 18 Start of paragraph | 10 | | | | | |

| | 7 | 8 | 9 | 10 | 11 | 12 | 13 | 14 | 15 | 16 | 17 |
|---|---|---|---|---|---|---|---|---|---|---|---|
| | Comma | Repeating characters that cannot be broken across lines | Preceding abbreviation code | Following abbreviation code | Full-width ideographic spaces | Hiragana | Japanese character other than those listed above | Full-width numeral | Half-width numeral | Half-width Roman text | End of line |
| | 8 | | | | | | | | | | |
| | | 2 | 2 | 2 | | 2 | 2 | 2 | 2 | 2 | 13 |
| | | 8 | 8 | 8 | 8 | 8 | 8 | 8 | 8 | 8 | 16 |
| | | 5 | 5 | 5 | 5 | 5 | 5 | 5 | 5 | 5 | 14 |
| | | 7 | 7 | 7 | 7 | 7 | 7 | 7 | 7 | 7 | 15 |
| | | | | | | | | | | | |
| | | | | | | | | | | | |
| | | | | | | | | 9 | 9 | 9 | |
| | | | | | | 9 | 9 | 9 | 9 | 9 | |
| | | | | | | 9 | 9 | 9 | 9 | 9 | |
| | | | | | 11 | 11 | 11 | 11 | 11 | 11 | |

| | | Text Composition Spacing Amount Setting File Name |
|---|---|---|
| Default Settings | 1 | Set punctutation half-width at line end |
| | 2 | Set close paren / quote half-width at line end, paragraph indentation 1 em (set opening paren / quote full-width) |
| | 3 | Set close paren / quote half-width at line end, paragraph indentation 1 em (set opening paren / quote half-width) |
| | 4 | Set punctutation full-width, paragraph indentation 1 em |
| | 5 | Set punctuation full-width, paragraph indentation 1 em (set opening paren / quote full-width) |
| | 6 | Set punctuation full-width / half-width at line end, paragraph indentation 1 em |
| | 7 | Set punctuation full-width / half-width at line end, paragraph indentation 1 em (set opening paren / quote full-width) |
| | 8 | Set punctuation full-width / half-width at line end, paragraph indentation 1 em (set opening paren / quote half-width) |
| | 9 | Set punctuation half-width at line end, paragraph indentation 1 em |
| | 10 | Set punctutation full-width |
| | 11 | Set close paren / quote full-width / half width at line end |
| | 12 | Set period full-width at line end, paragraph indentation 1 em |
| | 13 | Set period full-width at line end, paragraph indentation 1 em (set opening paren / quote full-width) |
| | 14 | Set period full-width at line end |
| Individual Settings | 15 | |
| | 16 | |
| | 17 | |
| | 18 | |
| | 19 | |
| | 20 | |

FIG._9

| | Previous Character | 1 | 2 | 3 | 4 | 5 | 6 |
|---|---|---|---|---|---|---|---|
| | | Starting parenthesis type | Ending parenthesis type | Character that cannot appear at the start of a line | Non-centered punctuation | Centered punctuation | Period |
| Next Character | | | | | | | |
| 1 | Starting parenthesis type | | | | | | |
| 2 | Ending parenthesis type | | | | | | |
| 3 | Character that cannot appear at the start of a line | | | | | | |
| 4 | Non-centered punctuation | | | | | | |
| 5 | Centered punctuation | | | | | | |
| 6 | Period | | | | | | |
| 7 | Comma | | | | | | |
| 8 | Repeating characters that cannot be broken across lines | | | | | | |
| 9 | Preceding abbreviation code | | | | | | |
| 10 | Following abbreviation code | | | | | | |
| 11 | Full-width ideographic spaces | | | | | | |
| 12 | Hiragana | | | | | | |
| 13 | Japanese character other than those listed above | | | | | | |
| 14 | Full-width numeral | | | | | | |
| 15 | Half-width numeral | | | | | | |
| 16 | Half-width Roman text | | | | ▨ | | |
| 17 | Start of line | | | | | | |
| 18 | Start of paragraph | | | | | | |

| Optimum | Minimum | Maximum | Priority |
|---|---|---|---|
| 50% | 0% | 50% | 3 |

*FIG._10A*

| 7 | 8 | 9 | 10 | 11 | 12 | 13 | 14 | 15 | 16 | 17 |
|---|---|---|---|---|---|---|---|---|---|---|
| Comma | Repeating characters that cannot be broken across lines | Preceding abbreviation code | Following abbreviation code | Full-width ideographic spaces | Hiragana | Japanese character other than those listed above | Full-width numeral | Half-width numeral | Half-width Roman text | End of line |

| FIG. 10A | FIG. 10B |

Character Spacing Settings

Character Composition: Line end punctuation half-width

Previous character class ▶ : Starting parathesis type ▶   % ▶

Examples of Character Classes:

| Types | Ending Character Class | Desired | Minimum | Maximum | Priority |
|---|---|---|---|---|---|
| ✉ ↑ ⤴ | Starting Parentheses: | 0% ▶ | 0% ▶ | 0% ▶ | 3 ▶ |
| ⚠ ↑ ⤴ | Ending Parentheses: | 0% ▶ | 0% ▶ | 0% ▶ | 3 ▶ |
| ↑ ⤴ | Line Head Japanese Word-wrapping: | 0% ▶ | 0% ▶ | 0% ▶ | None ▶ |
| ? ↑ ⤴ | Ending Punctuation Marks: | 0% ▶ | 0% ▶ | 0% ▶ | None ▶ |
| ⋯ ↑ ⤴ | Conjunctive Dots: | 25% ▶ | 0% ▶ | 25% ▶ | 1 ▶ |
| ↑ ⤴ | Commas: | 0% ▶ | 0% ▶ | 0% ▶ | None ▶ |
| ↑ ⤴ | Period: | 0% ▶ | 0% ▶ | 0% ▶ | 2 ▶ |
| ⋮ ↑ ⤴ | Ellipses: | 0% ▶ | 0% ▶ | 0% ▶ | None ▶ |
| ※ ↑ ⤴ | Previous Abbreviated Symbols: | 0% ▶ | 0% ▶ | 100% ▶ | None ▶ |
| % ↑ ⤴ | Subsequent Abbreviated Symbols: | 0% ▶ | 0% ▶ | 100% ▶ | None ▶ |
| ↑ ⤴ | Ideaographic Spaces: | 0% ▶ | 0% ▶ | 100% ▶ | None ▶ |
| あ ↑ ⤴ | Hiragana: | 0% ▶ | 0% ▶ | 0% ▶ | None ▶ |
| 漢 ↑ ⤴ | Other Ideographs: | 0% ▶ | 0% ▶ | 100% ▶ | None ▶ |
| 8 ↑ ⤴ | Full-width Digits: | 0% ▶ | 0% ▶ | 100% ▶ | None ▶ |
| 8 ↑ ⤴ | Half-width Digits: | 0% ▶ | 0% ▶ | 100% ▶ | None ▶ |
| A ↑ ⤴ | Western Alphabet: | 0% ▶ | 0% ▶ | 0% ▶ | None ▶ |
| ↑ ⤴ | Line End: | 0% ▶ | 0% ▶ | 0% ▶ | None ▶ |
| ↑ ⤴ | Paragraph Head: | 0% ▶ | 0% ▶ | 0% ▶ | None ▶ |

[OK] [Cancel] [New] [Save] [Delete]

Basic Settings

*FIG._11*

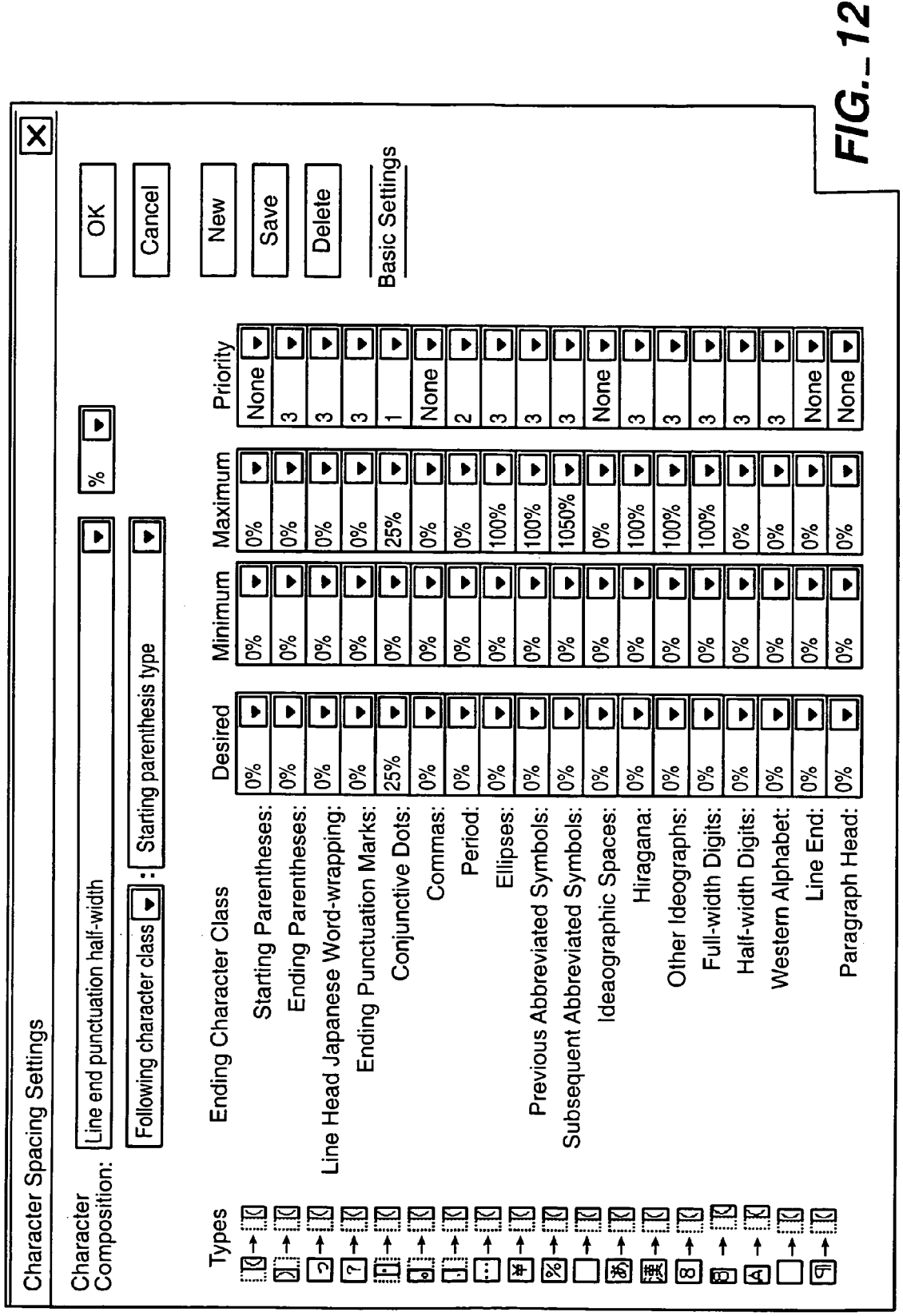
FIG._12

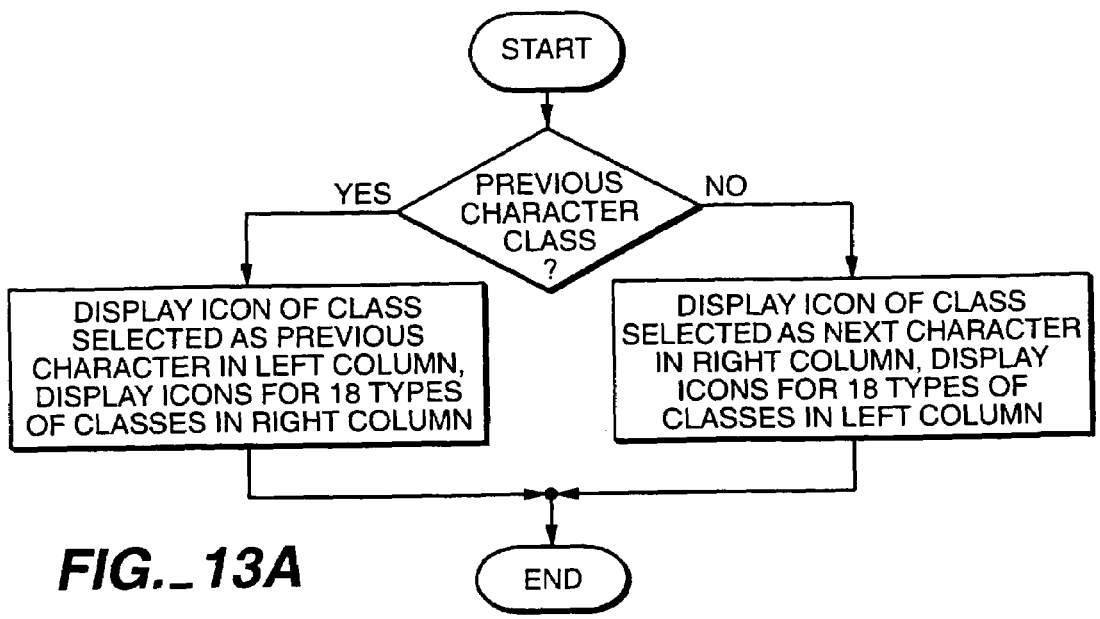

| Class Icon Table ||
| Character Class | Icon |
| --- | --- |
| Starting parenthesis | |
| Ending parenthesis | |
| Character that cannot appear at the start of a line | |
| Non-centered punctuation | |
| Centered punctuation | |
| Period | |
| Comma | |
| Repeating characters that cannot be broken across lines | |
| Preceding abbreviation code | |
| Following abbreviation code | |
| Full-width ideographic spaces | |
| Hiragana | |
| Japanese character other than above | |
| Full-width numeral | |
| Half-width numeral | |
| Half-width Roman text | |
| End of line | |
| Start of paragraph | |

TEXT COMPOSITION SPACING AMOUNT SETTING DEVICE WITH ICON INDICATORS

CROSS-REFERENCE TO RELATED APPLICATIONS

This application claims the benefit of prior U.S. provisional application 60/235,260, filed Sep. 25, 2000.

BACKGROUND

The invention relates to desktop publishing (DTP). In electronic line composition, a spacing amount between adjacent characters must be set in order to arrange a series of input characters in each line in an electronic text. In electronic composition based on Japanese text, an extremely large number of characters and many types of characters must be processed, and therefore it is necessary to rationally set the spacing amount based on character attributes. In practice, however, each publishing company has its own rules, and in existing electronic composition systems it is complicated to set the spacing amount between characters. This leads to operations that are difficult and hard to understand for a user. JISX 4051-1995 provides guidelines for line composition and describes inter-character spacing amounts, but does not address how a user can easily and rationally set inter-character spacing amounts.

A character spacing amount is required when arranging input characters in each line in an electronic text. In electronic composition, line composition involves properly adjusting the spacing amount based on processing of characters that cannot appear at the beginning or end of lines and each character's properties, and so on. Therefore, preset values for the spacing amount are provisional in line composition, and ultimately the spacing amount is adjusted in line composition processing. The inter-character spacing amounts are determined to some extent by the contents of an electronic document, and therefore it is important in electronic composition that a user be able to easily and quickly set this type of spacing amount.

As described above, in existing electronic composition art a user can set the spacing amount between a pair of adjacent characters. An electronic document in which Japanese is present has a large number of characters and character types, so there are many possibilities for setting spacing amounts. Accordingly, when performing text composition spacing amount setting, a user does not immediately know what sort of setting items are being set, so the spacing amount is likely to be set erroneously.

SUMMARY

In general, in one aspect, this invention provides methods and apparatus, including computer program products, implementing and using techniques for setting a text composition spacing amount in a desktop publishing (DTP) system. At least one inter-character-class spacing amount setting table, for use in line composition, groups similar characters, forms a plurality of character classes and sets inter-character spacing amounts between a character class of a previous character and a character class of a next character within a pair of continuous characters. A display device for displays electronic text that has been line composed and an input device receives user input. A spacing amount setter displays on the display device a dialog box for user input of a spacing amount between the character class for the previous character and the character class for the next character, and displays in the dialog box an icon representing the character class for the previous character and an icon representing the character class for the next character.

Advantageous implementations can include one or more of the following features. The character classes can include one or more of (1) starting parenthesis, (2) ending parenthesis, (3) characters that cannot appear at the start of a line, (4) non-centered punctuation, (5) centered punctuation, (6) period, (7) comma, (8) repeating characters that cannot be broken across lines, (9) preceding abbreviation code, (10) following abbreviation code, (11) full-width ideographic spaces, (12) hiragana, (13) Japanese characters other than character classes (1) through (12), (14) full-width numeral, (15) half-width numeral, (16) half-width Roman text, (17) start of line, (18) start of paragraph, and (19) end of line.

A user selection of either the character class of the previous character or the character class of the next character in the dialog box can be received. A left side display column can be provided for icons of the character class for the previous character and a right side display column can be provided for icons for the character class of the next character in the dialog box. The device can display an icon representing a selected character class, among a plurality of classes, for the previous character in the left side display column, and display an icon representing a selected character class, among a plurality of classes, for the next character in the right side display column.

The invention can be implemented to realize one or more of the following advantages.

A user may easily and quickly set inter-character spacing amounts in electronic composition. A user may selectively use a simple settings mode and a detailed settings mode, which provides flexibility in setting inter-character spacing amounts according to a user's level of experience or the contents of an electronic document undergoing electronic composition.

A user may easily confirm which setting items have their spacing amount set and eliminate the possibility of erroneous spacing amount setting. A user's ease of use may increase. A user may select a basic (simple) settings mode or a detailed settings mode and set text composition spacing amounts, which increases the flexibility of setting spacing amounts. Spacing amounts may be set by user input in a dialog box, and an icon may be displayed for each character class for each setting item in the dialog box, so visual feedback is provided to the user. Therefore, the invention allows a user to perform input quickly and without causing errors.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 1 is a schematic block diagram showing a DTP system provided with a text composition spacing amount setting function in accordance with one implementation of the invention.

FIG. 2 is a schematic block diagram showing a DTP system based on a general-purpose computer provided with a text composition spacing amount setting function in accordance with another implementation of the invention.

FIG. 3 is a schematic drawing showing part of a screen during editing of an electronic document displayed on the screen of a CRT in a DTP system.

FIG. 4 is a flowchart showing the processing flow of a text composition spacing amount setting function based on one implementation of the invention.

FIG. 5 is a schematic diagram showing an example of a dialog box displayed when "basic settings" is selected in the text composition spacing amount setting function in accordance with the invention.

FIG. 6 is a schematic diagram showing a display example corresponding to FIG. 5 but when the spacing amount unit is selected as "Japanese fractional 'bun' unit" display.

FIG. 7 is a schematic diagram showing one example of a dialog box displayed when "detailed settings" is selected in the text composition spacing amount setting function in accordance with the invention.

FIGS. 8A and 8B are a schematic diagram showing one example of a spacing amount association table used in "basic settings."

FIG. 9 is a schematic drawing showing a list of file names of spacing amount setting tables stored in a spacing amount setting file.

FIGS. 10A and 10B are a schematic drawing showing one example of a spacing amount setting table stored in a spacing amount setting file.

FIG. 11 is a schematic drawing showing the dialog box in FIG. 7 when "detailed settings" is selected and the inventive text composition spacing amount setting function changes to "character that cannot appear at the start of a line" as the previous character class.

FIG. 12 is a schematic drawing showing the dialog box in FIG. 7 when "detailed settings" is selected and the inventive text composition spacing amount setting function changes from previous character class to next character class.

FIG. 13A is a flowchart showing the algorithm for icon display in the detailed settings dialog box.

FIG. 13B is a schematic drawing showing an icon table used in spacing amount setting.

Like reference symbols in the various drawings indicate like elements.

DETAILED DESCRIPTION

FIG. 1 shows an electronic composition DTP system 1, in accordance with one implementation of the invention. The DTP system 1 includes a DTP processing control device 2 that can execute electronic composition such as layout and editing, a display device 3 that can display data being processed, an input device 5 with which a user can input various types of data such as graphics, text, control instructions, and an output device 6 for outputting processed data. The DTP processing control device 2 includes a composition controller 2a for controlling composition, a layout controller 2b for layout and editing, and a font file 2c storing font information, which are the attributes of text to be output for display, printing, and so on. In the system shown in FIG. 1, a font file 2c contains a CJK font 8, which is a font for ideographic characters, such as Japanese, Chinese, Korean. In addition, in the system shown in FIG. 1, the composition controller 2a includes a line composition controller 7a that arranges within a line a plurality of characters that are being composed in electronic composition, a spacing amount setting file 7b that sets a spacing amount. The spacing amount is the spacing from the start of a line or the end of a line for a character arranged at the start of a line or the end of a line, respectively, and the space between pairs of adjacent characters within a line and that is used when doing line composition. The composition controller 2a also includes a spacing amount setter 7c with which a user can set the spacing amount set in the spacing amount setting file 7b.

The display device 3 can include any type of conventional display device such as a CRT, LCD, and so on. The input device 5 can include a keyboard, a pointing device (mouse, track ball, track pointer), a scanner, a communication interface, and so on. The output device 6 can include a printer, an external memory device, and so on. The DTP processing control device 2 can include a processor or memory, such as a CPU, or an electronic composition processing program that includes various program routines, such as a composition control routine, layout and editing routine, that is loaded into a memory and processed by a processor. On the other hand, the DTP processing control device 2 can also include, in whole or in part, hardware made into firmware.

FIG. 2 is a block diagram showing a DTP system 10 in which the text composition spacing amount setting function is performed by a general-purpose computer system. The system includes a CPU 11, a memory 12, a CRT 13, a hard disk 14, a keyboard 15, a mouse 16, a CD-ROM drive 17, an FD drive 18, and a printer 19. These units are interlinked in operation by a bus 9. A DTP processing program 7' is installed in the system 10 together with other electronic editing programs. The DTP processing program 7' includes a line composition control routine 7a used in electronic composition, a spacing amount setting file 7b used in electronic composition and a spacing amount setting routine 7c that enables a user to set the spacing amount in the spacing amount setting file 7b. The DTP processing program 7' and the other electronic editing programs can be installed via the CD-ROM drive 17 or the FD drive 18, or can be downloaded via a communication network, such as the Internet, and be stored on the hard disk 14, for example. In addition, a layout control routine or the font file 2c can also be stored on the hard disk 14. The DTP processing program 7' stored on the hard disk 14 can be started by a user operating the keyboard 15 or the mouse 16, and is loaded into the memory 12 as shown in FIG. 2. Thus, the loaded DTP processing program 7' exists in both the CPU 11 and in the memory 12, and constitutes the DTP processing control device 2, and contains as a part thereof the spacing amount setting file 7b and the spacing amount setter 7c. Therefore, in one aspect of the invention, the invention provides a computer program product, tangibly stored on a computer-readable storage medium (for example, a CD-ROM, FD, tape, semiconductor memory, and so on), that can convert a general-purpose computer system to a DTP system 10 provided with the inventive text composition spacing amount setting functionality.

FIG. 3 shows a part 20 of a screen display of the display device 3 or CRT 13 during DTP processing in the DTP system 1 or 10 shown in FIG. 1 or FIG. 2. Specifically, FIG. 3 shows a situation in which "new" was selected in a pulldown menu obtained by clicking on "file (F)" 24 on the menu bar, a new electronic document having a page layout grid 21 was opened, a text tool 22a was selected in a tool box 22, a frame 23 for text alignment was demarcated and text including of a multiple characters was input in the frame 23. In the example shown in FIG. 3, the text input into the frame 23 has been arranged in a plurality of lines and each character in each line has been arranged based on a spacing amount between a character and the start of the line or the end of the line, or between pairs of adjacent characters with a spacing that is preset for the start of the line, end of the line, and inside the line, respectively. If two characters are disposed adjacent to each other in the same line, the spacing amount set between them based on their character attributes is stored in advance in the spacing amount setting file 7b. Also, in practice, when multiple characters are disposed in one line, those characters are disposed in the line based on the spacing amounts obtained from the spacing amount setting file 7b for those characters and the line composition control routine 7a appropriately adjusts the spacing amount by processing characters tat cannot appear at the start of a line, and the characters are suitably disposed in the line.

The line composition control routine 7a refers to the text composition spacing amount when disposing a plurality of characters in a line, and if necessary it disposes characters in the line while adjusting the spacing amount within the allowed range, so it is necessary to set the spacing amount for the characters used in advance. In addition, the spacing amount set for a plurality of characters disposed in a line may differ depending on the contents of an electronic document, or according to a user's preferences, so a user needs to be able to set the spacing amount. Also, it is important that this sort of spacing amount setting be flexible and easy for a user to use and capable of quick setting. Specifically, when the spacing amount is set based on user preferences or a standard used in a particular publishing industry, the spacing amount is sometimes not set frequently; once an appropriate value has been set, it is subsequently essentially not reset. In addition, in line composition setting the spacing amount is usually not a fixed matter; sometimes a preset spacing amount is appropriately adjusted when doing forbidden processing, and so on. Therefore, it is not always necessary for the user to perform detailed spacing amount setting; sometimes setting a typical spacing amount is sufficient.

In electronic composition such as that described above, user setting of the text composition spacing amount is desirable. It is also desirable to have a DTP system provided with a spacing amount setting function with which a user can easily and quickly set the spacing amount. The invention provides a text composition spacing amount setting device and a text composition spacing amount setting program that can be used in a DTP system. In other words, the invention includes a text composition spacing amount setting function incorporated in a DTP processing system, and makes it possible to start a text composition spacing amount setting routine by selecting "text composition spacing amount setting" in a pulldown menu displayed by clicking "format (T)" in a menu bar on the screen of the CRT shown in FIG. 3.

The general processing for text composition spacing amount setting based on the invention is shown in the FIG. 4 flowchart. As described above, when a user left-clicks with a mouse on "format (T)" 25 in a menu bar on the screen of a CRT, a pulldown menu is displayed (step S1). Next, when the user clicks with the mouse (step S2) on one of the setting modes in the pulldown menu—"basic settings" or "detailed settings" in "text composition spacing amount setting"—the dialog box for the selected mode (step S3) is displayed according to the selected mode. For example, if the basic settings mode is selected, the basic settings dialog box is displayed (step S4), and if the detailed settings mode is selected, the detailed settings dialog box is displayed (step S6). FIG. 5 and FIG. 6 show two examples of the basic settings dialog box, and FIG. 7 shows one example of the detailed settings dialog box. In the basic settings mode the number of user-settable spacing amounts is limited to those usually needed in setting, so when setting the spacing amount in basic settings mode, setting is performed using the spacing amount relationship table (step S5). On the other hand, in the detailed settings mode the spacing amount is set individually with direct access to spacing amount setting file 7b.

As shown in FIG. 5 and FIG. 6, a "detailed settings" button is provided in the basic settings dialog box, and a user who user clicks on this button can switch from the basic settings mode to the detailed settings mode (step S7). A "basic settings" button is provided in the detailed settings dialog box, and a user who user clicks on this button can switch from the detailed settings mode to the basic settings mode (step S8). In addition, a file name can be given to a spacing amount setting table that is modified or newly set according to this text composition spacing amount setting routine, and it can be saved in the spacing amount setting file 7b (step S9, S10), and this routine can be ended with or without saving (step S11).

The text composition spacing amount setting routine outlined above, which is based on one implementation of the invention, shown in FIG. 4, will be explained in additional detail below. First, if a user selects the basic settings mode, the basic settings dialog box shown in FIG. 5 is displayed. Specifically, in the dialog box shown in FIG. 5, "set punctuation full-width" is displayed as the item selected for "Japanese text composition." This "set punctuation full-width" is the name of a file selected from among a plurality of spacing amount setting tables stored in the spacing amount setting file 7b. That is, the spacing amount setting routine 7c saves the file names of a plurality of spacing amount setting tables stored in the spacing amount setting file 7b as shown in FIG. 9. Also, by displaying a pulldown menu in the "Japanese text composition" list box in the FIG. 5 dialog box, a user can display as a list the file names of a plurality of spacing amount setting tables saved in the current spacing amount setting file 7b. Also, a user can select with a mouse the desired spacing amount setting table from the list thus displayed, and the current spacing amount value stored in the selected spacing amount setting table is displayed in the dialog box.

Furthermore, in the implementation shown in FIG. 9, the list of file names of spacing amount setting tables stored in the spacing amount setting routine 7c is stored classified as "default settings" and "individual settings." "Default settings" stores the file names for 14 spacing amount setting tables. These are tables in which spacing amount settings that are generally and frequently used are prepared in advance as default settings. Preferably a user should not be able to modify these default setting files. A user can instead modify the spacing amounts from the default values only for the spacing amounts that need to be modified and save the modified spacing amounts as a separate file. As shown in FIG. 9, in this implementation a spacing amount setting table can be saved in "individual settings." For example, if a user wants to create a spacing amount setting table with almost the same setting values as "set punctuation full-width," which is the default setting table in FIG. 5, but somewhat different spacing amounts, the user clicks on the "new" button in FIG. 5. This allows the user to enter a file name for a new spacing amount setting table and the newly entered file name is displayed in a box beside "Japanese text composition." A new spacing amount setting table can now be created by modifying or entering spacing amounts in the FIG. 5 dialog box, and the new spacing amount setting table is saved in the spacing amount setting file 7b. The file name of that spacing amount setting table is saved in the "individual settings" section of FIG. 9. A spacing amount setting table saved in the "individual settings" section in this way can be retrieved any number of times by specifying that file name in either basic settings or detailed settings, and the spacing amount settings can be modified and saved. A spacing amount setting table whose file name is stored in the individual settings section is one that was individually created by a user, so a user can freely set and modify any spacing amount any number of times. By dividing and saving the plurality of spacing amount setting tables stored in the spacing amount setting file 7*b* as "default settings" that a user cannot modify and "individual settings" that a user can freely modify, respectively, as shown in FIG. 9, the ease of setting and modifying spacing amounts greatly increases for the user.

As shown in FIG. 5, the setting items in the inventive text composition spacing amount basic settings are categorized as end of line, start of line, and middle of line. Accordingly, a user knows at one glance to which part of each line a setting item pertains. The spacing amount setting items include 16 items, and it is possible to set three spacing amounts—"optimum," "minimum," and "maximum"—for each setting item. In one implementation, the spacing amount settings are limited to these 16 items.

As advocated in JISX 4051-1995, "Line Composition Methods for Japanese Language Documents," character classes can be defined according to character composition attributes, such as the divisibility of characters such as text, and so on according to character width, character spacing and forbidden processing parameters. In the invention, in addition to start of line, start of paragraph, and end of line, the following 16 character classes are defined.

(1) Starting parenthesis
 Example: (
(2) Ending parenthesis
 Example: )
(3) Character that cannot appear at the start of a line
 Example: /~
(4) Non-centered punctuation
 Example: !?
(5) Centered punctuation
 Example: :;
(6) Period
 Example: .
(7) Comma
 Example: ,
(8) Repeating characters that cannot be broken across lines
 Example: —
(9) Preceding abbreviation code
 Example: $
(10) Following abbreviation code
 Example: %° C.
(11) Full-width ideographic spaces
(12) Hiragana
(13) Japanese character other than (1) through (12) above
(14) Full-width numeral
 Example: 0 1 2 3 4 5 6 7 8 9
(15) Half-width numeral
 Example: 0123456789
(16) Half-width Roman text
 Example: ABCDEFGHIJKLMNOPQRSTUVWXYZ The characters used in Japanese language documents are classified into 16 character classes as shown above and based on these character classes it is possible to set inter-character spacing, that is, the spacing amount between characters, according to whether a character disposed in a line is the start of a paragraph or the start of a line or the end of a line, or if the character is inside a line according to which character classes a pair of adjacent characters belongs to. For example, if the previous character in a pair of adjacent characters inside a line is kanji and the next character is hiragana, the previous character's character class is "Japanese character other than above" and the next character's character class is "hiragana," so the spacing amount between these characters can be set as 50%, for example (half the width of full-width, i.e. one-half).

In one implementation of the invention the spacing amount between a pair of adjacent characters is set based on the character class of the previous character and the character class of the next character, using the 16 character classes defined above and start of paragraph, start of line, and end of line as parameters. FIG. 10 shows one example of a text composition spacing amount setting table set in this manner. As shown in FIG. 10, in one implementation of the invention the spacing amount setting table lists the 16 previously described character classes, start of line and start of paragraph as parameters for "previous character" in the vertical axis direction, and lists the 16 previously described character classes and end of line as parameters for "next character" in the horizontal axis direction. Also, for example, if the character class of the previous character is "half-width Roman text" and the character class of the next character is "centered punctuation," the spacing amount that should be set for this pair of characters is set at the intersection. In the example shown in FIG. 10, the three spacing amounts "optimum," "minimum," and "maximum" can be set at each intersection, as can "priority," which determines the type of sequence used in making adjustments in this spacing amount in relation to other spacing amounts when adjusting the spacing amount when doing line composition processing. Furthermore, in order to avoid complexity, FIG. 10 shows a representative spacing amount setting and priority setting for only one intersection, but the same sort of spacing amount and priority setting can be done at each intersection in the spacing amount setting table in FIG. 10.

The spacing amount setting table shown in FIG. 10 basically forms a 18·17 matrix, and four values can be set at each intersection of a row and column, so a user can set 18·17·4 values in each spacing amount setting table. If a user wants to set each value in the spacing amount setting table as shown in FIG. 10, the user selects the detailed settings mode. When a user selects detailed settings mode, the dialog box shown in FIG. 7 is displayed on the CRT screen. FIG. 7 shows an case in which a spacing amount setting table with the file name "end of line punctuation half-width" as the default setting, stored in the spacing amount setting file 7*b*, has been selected. Also, previous character's character class has been selected, and "starting parenthesis" has been selected as that class, and examples of the contents of that class are displayed below. It is possible to select next character class instead of previous character class. Any one of the 18 parameters as shown in the table in FIG. 10 can be selected as the previous character class, and any one of the 17 parameters as shown in FIG. 10 can be selected as the next character class.

In the example shown in FIG. 7 starting parenthesis is selected for previous character class, so the 17 parameters from "starting parenthesis," which is the next character class, to "end of line" are sequentially arranged in the vertical direction relative to this. Therefore the uppermost level in this arrangement shows the setting values for the spacing amount (optimum 0%, minimum 0%, maximum 0% and the priority (none) when the previous character class is starting parenthesis and the next character class is starting parenthesis, and the next level shows the setting values for spacing amount (optimum 0%, minimum 0%, maximum 0%) and priority 3 when the previous character class is starting parenthesis and the next character class is ending parenthesis.

As described above, in FIG. 7 the file name of the spacing amount setting table for the default settings is "end of line punctuation half-width," so a user cannot modify the setting values in this table, but if a user presses the "new" button and creates a copy of this table and gives it a new file name, the user can freely modify the setting values by storing it in the spacing amount setting file 7b as "individual settings." Spacing amounts newly set by a user and newly stored in the spacing amount setting file 7b in this manner can be used in line composition processing.

As described above, a user can modify each setting value in the spacing amount setting table shown in FIG. 10 by selecting detailed settings mode, but setting spacing amounts is not always performed frequently; often a user sets the preferred spacing amounts once and uses those spacing amount settings repeatedly, and subsequently does not reset the spacing amounts for a long time. In addition, even when setting spacing amounts it is very rare that each setting value in the table shown in FIG. 10 needs to be modified and the items which many users need to modify in general are often the same items.

In the invention it is possible for a user to select basic settings mode and simply and quickly set spacing amounts. We have studied the various associations between the character class of the previous character and the character class of the next character in the FIG. 10 spacing amount setting table, and grouped similar classes and formed a spacing amount association table having 16 links as shown in FIG. 8. Each link indicated by the numbers 1 through 16 in the spacing amount association table shown in FIG. 8 is as follows.

1) Non-punctuation -> Starting parenthesis,
2) Ending parenthesis -> Non-punctuation,
3) Ending parenthesis -> Starting parenthesis,
4) Period -> Starting parenthesis,
5) Period -> Non-punctuation,
6) Comma -> Starting parenthesis,
7) Comma -> Non-punctuation,
8) Centered punctuation -><- Centered punctuation,
9) Half-width Roman text -><- Non-punctuation,
10) Start of paragraph -> Starting parenthesis,
11) Start of paragraph -> Non-punctuation,
12) Start of line -> Starting parenthesis,
13) Ending parenthesis -> End of line,
14) Period -> End of line,
15) Comma -> End of line,
16) Centered punctuation → End of line Furthermore, "non-punctuation" includes characters that cannot appear at the start of a line, non-centered punctuation, repeating characters that cannot be broken across lines, preceding abbreviation codes, following abbreviation codes, hiragana, Japanese characters other than the above, full-width numerals, half-width numerals, and half-width Roman text; these are character classes shown in the table in FIG. 8.

Also, the 16 links correspond to input (setting) items shown in the 16 dialog boxes shown in FIG. 5. That is, the links 13)~16) correspond to the four setting items for "end of line" in the dialog box in FIG. 5, the links 10)~12) correspond to the three setting items for "start of line" in the dialog box in FIG. 5, and the links 1)~9) correspond to the nine setting items for "middle of line" in the dialog box in FIG. 5. For example, the initial setting item in the section for "middle of line" in the dialog box in FIG. 5 is shown as the setting item "non-punctuation→starting parenthesis" and this corresponds to the link shown as "1" in the spacing amount association table in FIG. 8. Therefore, if the character class of the next character is "starting parenthesis," this shows that the same spacing amount is set if the character class of the next character is any one of "character that cannot appear at the start of a line," "non-centered punctuation," "repeating characters that cannot be broken across lines," "preceding abbreviation codes," "following abbreviation codes," "hiragana," "Japanese characters other than the above," "full-width numerals," "half-width numerals," and "half-width Roman text." If a user sets 50% as the spacing amount for "optimum," 0% for "minimum," and 50% for "maximum" in the initial setting item "non-punctuation→starting parenthesis" in the "middle of line" section in the dialog box in FIG. 5, that spacing amount setting is simultaneously set for the 10 combinations of previous character class and next character class indicated by "1" in FIG. 8, and the user does not need to individually set 10 combinations. Also, simply setting the three spacing amounts for optimum, minimum, and maximum for at most 16 setting items as shown in FIG. 5 is sufficient as the ordinary spacing amount setting. In addition, if a "priority" setting is used in adjusting the spacing amount in ordinary composition it often involves special composition, so that it is excluded from the setting items in the basic settings dialog box shown in FIG. 5. Accordingly, if the invention's basic settings are used the number of settings is reduced from 18·17·4 settings to 16·3 settings compared to using detailed settings, and the user's spacing amount setting is greatly simplified.

Furthermore, FIG. 6 shows a case in which spacing amount setting values are displayed when "Japanese fractional 'bun' unit" display is selected instead of displaying spacing amount setting values as percentages (that is, % of width of full-width character) in the FIG. 5 dialog box. A user can display spacing amounts as a % display or Japanese fractional "bun" unit display by selecting either "%" or "bun" in a pull-down menu in the dialog box.

Next, we will explain an implementation for displaying icons for a plurality of character classes in a dialog box for text composition spacing amount setting in accordance with the present invention.

First, the basic settings dialog box shown in FIG. 5 is provided with a left side icon display column for displaying icons for the character class of the previous character at the left side of the dialog box and with a right side icon display column for displaying icons for the character class of the next character. Also displayed in the "end of line" section are icons representing the character classes for the combinations "ending parenthesis -> end of line," "period -> end of line," "comma -> end of line," and "centered punctuation -> end of line" in the left side and right side icon display columns, respectively. Displayed in the "start of line" section are icons representing the character classes for the combinations "start of paragraph -> starting parenthesis," "start of paragraph -> non-punctuation," and "start of line -> starting parenthesis" in the left side and right side icon display columns. Displayed in the "middle of line" section are icons representing the character classes for the combinations "non-punctuation -> starting parenthesis," "ending parenthesis -> non-punctuation," "ending parenthesis -> starting parenthesis," "period -> starting parenthesis," "period -> non-punctuation," "comma -> starting parenthesis," "comma -> non-punctuation," "before and after centered punctuation," and "non-punctuation before and after half-width Roman text and numerals" in the left side and right side icon display columns.

Furthermore, in the example of the basic settings dialog box shown in FIG. 5, the icons representing these character classes are fixed icons, that is, a user cannot select or modify these icons. As described previously, in the basic settings mode the number of user-settable spacing amounts is limited to an optimum number, and all setting items are displayed in the basic settings dialog box. Therefore, the icon display in the dialog box can be fixed.

Next, in the case of the detailed settings dialog box shown in FIG. 7, there are basically 18·17·4 setting values for each spacing amount setting table. Therefore, it is impossible to display all the setting items for the detailed settings dialog box in one dialog box. The spacing amount setter or the spacing amount setting routine 7c therefore stores icons representing a plurality of preselected character classes as a table as shown in FIG. 13B. Furthermore, the icon table shown in FIG. 13B is an icon table for a specific font; if multiple fonts are used, the icon table shown in FIG. 13B needs to be prepared for each font. Also, the font used in electronic composition is the default font; the font's glyphs may be smaller than the size (that is, full-width) of the embox (virtual body). Therefore the character class glyphs described above may be different in regard to what position they occupy in that font's embox and the magnitude of the size of that glyph, depending on the font used.

The icon table shown in FIG. 13B can be created, for example, by selecting classes representing a plurality of character classes for a specific font and making the classes into icons and storing them in an icon table. In addition, a user can create separate icons and store these in an icon table. Therefore each icon shown in the icon table in FIG. 13B shows the size of the embox of characters belonging to that character class, the glyph size, and the positional relationship of the glyph inside the embox. For example, the uppermost level in FIG. 13B shows the icon representing "starting parenthesis." This icon has the size of the embox, but the icon shows (dotted line) that the glyph is positioned within the right half of the embox and that no glyph is present in the left half of the embox. The character for "centered punctuation" class, fifth from the top, has the size of the embox, but from the icon one can easily see that there is one-fourth space at both sides and the glyph is positioned in the center. In addition, one can see at a glance from the icon that characters in the classes "half-width numeral" (fourth from the bottom) and "half-width Roman text" (third from the bottom) are half-width in size.

As shown in FIG. 7, input items are provided in the detailed settings dialog box where a user can suitably select the character class of the previous character and the character class of the next character. Furthermore, "previous character class" is shown in the input item in the example shown in FIG. 7, to show that the character class of the previous character is selected. "Starting parenthesis" is shown as the input item next to "previous character class," to show that "starting parenthesis" is selected as the character class of the previous character. In the icon display column in the FIG. 7 dialog box, icons representing "starting parenthesis" are shown in a vertical string in the left side of the icon display column for the previous character's character class. In the FIG. 7 dialog box the previous character's character class is selected, so opposite these are shown the various icons for the 17 character classes, as is clear from the explanation of the spacing amount setting table in FIG. 10. The previous character's character class is starting parenthesis, so the next character's character class cannot be start of paragraph, and therefore the input item at the lowest level in this case is grayed out. In the FIG. 7 dialog box four values can be set for the 17 setting items—optimum, minimum, maximum, priority—and it is possible to visually confirm in the icon display column which character class and which character class are set, thereby avoiding the occurrence of errors in spacing amount setting.

When displaying the detailed settings dialog box shown in FIG. 7, the spacing amount setter or spacing amount setting routine 7c controls the icons and related display in accordance with the algorithm shown in FIG. 13A. Next, the procedure for modifying the FIG. 7 display will be explained, with reference to the FIG. 13A algorithm. In the FIG. 7 display, the previous character's character class is selected, and "starting parenthesis" is selected as the previous character's character class. The starting parenthesis icon, retrieved from the FIG. 13B class table, is displayed in a vertical string in the icon display column for the previous character's character class in the dialog box. If a user selects "character that cannot appear at the start of a line" in the list box as the previous character's character class, the status changes to the dialog box shown in FIG. 11. In this case, first, "[small tsu]", which is the icon in icon table FIG. 13B representing characters that cannot appear at the start of a line, is displayed in a vertical string in the icon display column for the previous character's character class, and replaces the starting parenthesis icon. The setting values for optimum, minimum, maximum, and priority all change as well.

FIG. 12 shows the dialog box display obtained when, starting from the FIG. 7 dialog box display status, a user selects "following character class," which represents the next character class, in the list box where the user is displaying "previous character class." In this case, if the next character's character class is starting parenthesis, there are 18 possibilities for the corresponding previous character's character class, so the right side display and the left side display in the FIG. 7 icon display column are switched. A spacing amount can also be set if the previous character class is start of paragraph, as shown in the lowest level.

Even if many setting items are present in detailed settings, the character class and the character class set for each setting item are displayed as icons in a dialog box, so the possibility of mistaking the contents of setting items is minimized.

A number of embodiments of the invention have been described. Nevertheless, it will be understood that various modifications may be made without departing from the spirit and scope of the invention. Accordingly, other embodiments are within the scope of the following claims.

What is claimed is:

1. A desktop publishing (DTP) system, comprising:
    at least one inter-character-class spacing amount setting table defining inter-character spacing amounts in line composition, the spacing amount setting table defining spacing for a plurality of character classes, each character class grouping one or more similar characters, the system using the inter-character-class spacing amount setting table to set inter-character spacing amounts between pairs of contiguous characters according to a character class of a previous character and a character class of a next character in each pair of contiguous characters;
    a display device for displaying electronic text that has been line composed;

an input device for receiving user input; and means for displaying on the display device a dialog box for receiving a user input setting a spacing amount between the character class for the previous character and the character class for the next character, and where the dialog box identifies particular character classes using an icon representing the character class for the previous character and an icon representing the character class for the next character.

2. The DTP system of claim 1, wherein the plurality of character classes includes one or more of (1) starting parenthesis, (2) ending parenthesis, (3) characters that cannot appear at the start of a line, (4) non-centered punctuation, (5) centered punctuation, (6) period, (7) comma, (8) repeating characters that cannot be broken across lines, (9) preceding abbreviation code, (10) following abbreviation code, (11) full-width ideographic spaces, (12) hiragana, (13) Japanese characters other than character classes (1) through (12), (14) full-width numeral, (15) half-width numeral, (16) half-width Roman text, (17) start of line, (18) start of paragraph, and (19) end of line.

3. The DTP system of claim 1, further operable to receive a user selection of either the character class of the previous character or the character class of the next character in the dialog box.

4. The DTP system of claim 3, wherein a left side display column is provided for icons of the character class for the previous character and a right side display column is provided for icons for the character class of the next character in the dialog box, the device further being operable to display an icon representing a selected character class, among a plurality of classes, for the previous character in the left side display column, and to display an icon representing a selected character class, among a plurality of classes, for the next character in the right side display column.

5. A computer program product, tangibly stored on a computer-readable medium in a desktop publishing (DTP) system, comprising instructions operable to cause a programmable processor to:

display on a display device a spacing amount saved in an inter-character class spacing amount setting table in response to a user selection in the inter-character class spacing amount setting table defining inter-character spacing amounts in line composition, the spacing amount setting table defining spacing for a plurality of character classes, each character class grouping one or more similar characters, the system using the inter-character-class spacing amount setting table to set inter-character spacing amounts between pairs of contiguous characters according to a character class of a previous character and a character class of a next characters in each pair of contiguous characters; and display in the dialog box an icon representing the character class of the previous character and an icon representing the character class of the next character.

6. The computer program product of claim 5, wherein the plurality of character classes includes one or more of: (1) starting parenthesis, (2) ending parenthesis, (3) Japanese characters tat cannot appear at the start of a line, (4) non-centered punctuation, (5) centered punctuation, (6) period, (7) comma, (8) repeating characters that cannot be broken across lines, (9) preceding abbreviation code, (10) following abbreviation code, (11) full-width ideographic spaces, (12) hiragana, (13) Japanese characters other than character classes (1) through (12), (14) full-width numeral, (15) half-width numeral, (16) half-width Roman text, (17) start of line, (18) start of paragraph, and (19) end of line.

7. The computer program product of claim 5, further operable to receive a user selection of either the character class of the previous character or the character class of the next character in the dialog box.

8. The computer program product of claim 7, further operable to:

display a left side display column for icons of the character class of the previous character and a right side display column for icons of the character class of the next character in the dialog box;

display the icon of the selected character class in the left side display column when a character class among a plurality of character classes is selected for the previous character's character class; and display the icon of the selected character class in the right side display column when a character class among a plurality of character classes is selected for the next character's character class.

9. A desktop publishing (DTP) system, comprising:

at least one inter-character-class spacing amount setting table defining inter-character spacing amounts in line composition, the spacing amount setting table defining spacing for plurality of character classes, each character class grouping one or more similar characters, the system using the inter-character-class spacing amount setting table to set inter-character spacing amounts between pairs of contiguous characters according to a character class of a previous character and a character class of a next character in each pair of contiguous characters;

a display means capable of displaying electronic text that has been line composed;

an input means with which a user can perform input; and a spacing amount setting means that is operable to start in response to user input, and to display on the display means a dialog box for receiving a user input setting a spacing amount between the character class of the previous character and the character class of the next character, and where the dialog box identifies particular character classes using an icon representing the character class of the previous character and an icon representing the character class of the next character.

10. A computer readable recording medium recording a text composition spacing amount setting program for executing by computer in a desktop publishing system, comprising:

a procedure for displaying on a display means in dialog box format a spacing amount saved in an inter-character-class spacing amount setting table when a user selects the inter-character-class spacing amount setting table defining inter-character spacing amounts in line composition, the spacing amount setting table defining spacing for a plurality of character classes, each character class grouping one or more similar characters, the system using the inter-character-class spacing amount setting table to set inter-character spacing amounts between pairs of contiguous characters according to a character class of a previous character and a character class of a next character in each pair of contiguous characters; and a procedure for displaying in the dialog box an icon representing the character class of the previous character and an icon representing the character class of the next character.

* * * * *

UNITED STATES PATENT AND TRADEMARK OFFICE
CERTIFICATE OF CORRECTION

PATENT NO.       : 7,168,037 B2
APPLICATION NO.  : 09/964293
DATED            : January 23, 2007
INVENTOR(S)      : Marilyn E. Shade and Shinji Hiramatsu It is certified that error appears in the above-identified patent and that said Letters Patent is hereby corrected as shown below:

Column 13, line 52, (claim 5) replace the word "characters" with --character--;

Column 13, line 59, (claim 6) replace the word "tat" with --that--;

Signed and Sealed this

Thirty-first Day of July, 2007

JON W. DUDAS
*Director of the United States Patent and Trademark Office*